United States Patent [19]
Grubb et al.

[11] Patent Number: 5,905,745
[45] Date of Patent: May 18, 1999

[54] NOISE SUPPRESSION IN CLADDING PUMPED FIBER LASERS

[75] Inventors: Stephen G. Grubb; Raymond Zanoni, both of Fremont, Calif.; Jean-Luc Archambault, Savage, Md.

[73] Assignee: SDL, Inc., San Jose, Calif.

[21] Appl. No.: 08/819,605

[22] Filed: Mar. 17, 1997

[51] Int. Cl.[6] .................................................. H01S 3/07
[52] U.S. Cl. ........................................ 372/6; 372/102
[58] Field of Search ................................. 372/6, 92, 96, 372/99, 102, 108; 385/37

[56] References Cited

U.S. PATENT DOCUMENTS

| | | | |
|---|---|---|---|
| 5,355,483 | 10/1994 | Serlet ........................................ 395/650 |
| 5,450,427 | 9/1995 | Fermann et al. ........................ 372/6 X |
| 5,530,710 | 6/1996 | Grubb ......................................... 372/6 |
| 5,544,271 | 8/1996 | Lim ......................................... 385/122 |
| 5,560,003 | 9/1996 | Nilsen et al. ............................ 395/600 |
| 5,627,848 | 5/1997 | Fermann et al. ........................ 372/6 X |
| 5,647,038 | 7/1997 | Minden et al. ............................ 385/37 |
| 5,671,307 | 9/1997 | Lauzon et al. ............................ 385/37 |
| 5,694,248 | 12/1997 | Erdogan et al. ........................ 359/570 |
| 5,696,782 | 12/1997 | Harter et al. ............................ 372/6 X |

OTHER PUBLICATIONS

*Appl. Phys. Lett.*, vol. 64, No. 20, May 16, 1994, pp. 2634–2638, Stable Single Mode Hybrid Laser with High Power and Narrow Linewidth, by P.A. Morton et al.

If Memory Serves, Hands On Some Assembly Required, by Rick Grehan, Aug. 1989, pp. 279, 280, 282, 284 and 337, *BYTE* Magazine.

Virtually Virtual Memory, Hands on Some Assembly Required, by Rick Grehan, Sep. 1990, pp. 455, 456, 458, 460, 462 and 464, *BYTE* Magazine.

*Evaluation of Parallel Copying Garbage Collection on a Shared–Memory Multiprocessor*, by Akira Imai et al., IEEE Transactions on Parallel and Distributed Systems, vol. 4, No. 9, Sep. 1993, pp. 1030–1040.

On Multi–Threaded List–Processing and Garbage Collection, by Wolfgang W. Kuehchlin et al., Department of Computer and Information Science, The Ohio State University, Jan. 1991, pp. 894–897.

HeapGuard™, Eliminating Garbage Collection in Real–Time Ada Systems, Sam Harbaugh et al., Integrated Software, inc., pp. 704–708. (No Date).

Windows, Windows' Invisible Wall: The 64K Barrier, by Ed Bott, Mar. 1994, pp. 210–212, *PC/Computing*.

Garbage Collection for Prolog Based on WAM, Communications of the ACM, vol. 31, issue 6, by Karen et al., Dec. 4,1996, pp. 1–20.

*Primary Examiner*—John D. Lee
*Attorney, Agent, or Firm*—Kudirka & Jobse, LLP

[57] ABSTRACT

A fiber laser uses a chirped Bragg grating as the output coupler and the grating is oriented so that the grating period increases in the direction towards the end of the cavity—the "red" end of the grating is at the output coupling end of the cavity. This grating orientation unexpectedly produces a relatively large reduction in the noise generated by the fiber laser. In one embodiment, the chirped Bragg grating is produced by transversely doping spaced-apart portions of the longitudinal fiber core with elements that modify the refractive index of the core. The "chirp" in the grating period is produced by modifying the period of the transversely doped fiber core portions during manufacture of the grating. In another embodiment, a partially reflective chirped fiber grating is used at the input side of the laser as well as at the output side. In yet another embodiment, the chirped grating is manufactured as an unchirped fiber grating where the period of the transversely-doped fiber core portions is constant and a chirp is introduced by selectively bending the fiber along its length, thereby producing a varying grating period.

16 Claims, 2 Drawing Sheets

NOISE SUPPRESSION IN CLADDING PUMPED FIBER LASERS

FIELD OF THE INVENTION

This invention relates generally to optical fiber lasers and, more particularly, to low noise, high-power cladding pumped fiber lasers.

BACKGROUND OF THE INVENTION

As is known in the art, a laser is a device that produces optical radiation using a population inversion in an active laser amplifying medium to provide light amplification by stimulated emission of radiation. The active medium is placed in an optical resonant cavity which provides positive feedback to generate oscillation. The resonant cavity is typically formed by surfaces or gratings which present a relatively high reflection to signals having a desired wavelength propagating within the cavity. The medium is conventionally pumped with intense energy from a pumping source to obtain the population inversion.

A fiber laser refers to a device in which the active laser amplifying medium is an optical fiber. Such a fiber typically has a core doped with an active element, for example, a rare earth element, and one or more cladding layers surrounding the core. When fiber lasers are used in practical communication systems, the output power of the laser is limited by the power available from the pump sources which pump the fiber.

A conventional technique of pumping the fiber core is to generate pumping power by an array of pump sources and launch the pumping power launching into a cladding layer using a technique commonly referred to as "cladding pumping". In a cladding pumped laser, a core is surrounded by a multi-mode cladding layer which, in turn, is surrounded by an outermost cladding layer. A relatively high-power multimode pumping signal from an array of sources is launched into the cladding. As the pumping energy propagates along the cladding layer, the energy is absorbed by the core, thereby pumping the core.

In order to insure that most of the pumping power is absorbed by the core, the optical fiber used in a fiber laser can have a length of 50 meters or more. A laser constructed with such a fiber has a very long laser cavity which can oscillate in many longitudinal modes. These modes have frequencies that are separated by an intermodal spacing value which is dependent on the round-trip propagation time of the light in the oscillator cavity.

One problem with multiple longitudinal modes in continuous wave lasers is the modes can beat together producing noise at the beat frequencies. Noise can also be produced by a phenomenon called "mode-locking." Although the longitudinal modes of a laser oscillator normally oscillate independently, their phases can be locked together by an external mechanism. For example, one such external mechanism could be absorption centers in the fiber in the region in which the light propagates. When the mode phases are locked together, the mode amplitudes combine to generate pulses in the output which appear as noise in a multiple longitudinal mode laser.

One mechanism for reducing mode beating and mode locking noise is to insure that the laser oscillates in only one longitudinal mode. An article entitled "Stable Single Mode Hybrid Laser with High Power and Narrow Bandwidth", P. A. Morton, V. Mizrahi, T. Tanbun-Ek, R. A. Logan, P. J. Lemaire, H. M. Presby, T. Erdogan, S. L. Woodward, J. E. Sipe, M. R. Phillips, A. M. Sergent and K. W. Wecht, *Applied Physics Letters*, v. 64, n. 20, May 16, 1994 discloses the use of a chirped fiber Bragg grating in a hybrid laser with a semiconductor—fiber cavity. The cavity is formed by coupling a semiconductor laser diode with an anti-reflection coating to an optical fiber. A chirped fiber Bragg grating forms one of the reflectors which define the laser cavity. Such a grating can be created using conventional doping techniques and can be arranged to transmit a portion of the laser light. Consequently, such gratings can be used as the output coupler of a laser cavity. The article describes that such a chirped Bragg grating can stabilize a single longitudinal mode when the chirped grating is oriented so that the grating period decreases in the direction towards the end of the laser cavity—the "blue" end of the grating is at the output coupling end of the cavity.

However, it would be desirable to decrease further the amount of noise in fiber laser output signals, especially in high-power lasers.

SUMMARY OF THE INVENTION

In accordance with the present invention, a fiber laser uses a chirped Bragg grating as the output coupler and the grating is oriented so that the grating period increases in the direction towards the end of the cavity—the "red" end of the grating is at the output coupling end of the cavity. In this orientation, the grating operates as an output coupler and suppresses mode locking and mode beat frequencies. However, this orientation unexpectedly also produces a relatively large reduction in the noise generated by the fiber laser.

In one embodiment, the chirped Bragg grating is produced by transversely doping spaced-apart portions of the longitudinal fiber core with elements that modify the refractive index of the core. The "chirp" in the grating period is produced by modifying the period of the transversely doped fiber core portions during manufacture of the grating.

In another embodiment, the fiber laser uses a second highly-reflective chirped Bragg grating at the input coupling side of the laser, in addition to that used as the output coupler. The second grating is oriented so that the grating period increases in the direction towards the input end of the cavity.

In still another embodiment, the chirped grating is manufactured as an unchirped fiber grating where the period of the transversely-doped fiber core portions is constant and a chirp is introduced by selectively bending the fiber along its length, thereby producing a varying grating period.

BRIEF DESCRIPTION OF THE DRAWINGS

The foregoing features of the invention, as well as the invention itself may be more fully understood from the following detailed description of the drawings, in which.

DETAILED DESCRIPTION OF THE PREFERRED EMBODIMENTS

Figure 1:
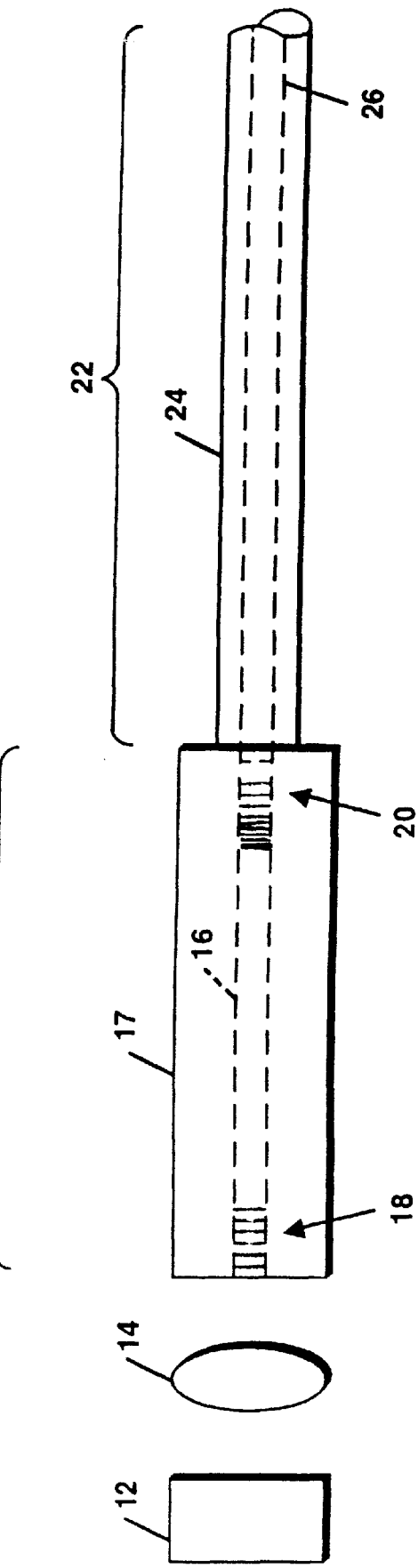
FIG. 1 is a schematic diagram of a cladding pumped continuous wave fiber laser incorporating a chirped fiber Bragg grating oriented in accordance with the principles of the invention.

Referring now to FIG. 1, laser 15 includes a core 16 surrounded by a cladding layer 17. The core 16 may illustratively be comprised of a silica glass fiber doped with neodymium ions (typically denoted $Nd^{3+}$), ytterbium ions ($Yb^{3+}$) or erbium ions ($Er^{3+}$), or combinations these dopants, such as erbium/ytterbium (Er:Yb) or neodynium/ytterbium (Nd:Yb). The fiber typically has a length typically in the range of about 1 to 50 meters. The neodymium ions are the active elements and therefore determine the output wavelength. Neodymium (Nd) lasers typically operate in a four-level mode and generate an output wavelength of 1060 nanometers (nm). It is also possible to suppress the 1060 nm output wavelength and operate the Nd laser as a three-level system in a conventional fashion. When operating as a three-level system, the Nd laser generates an output wavelength of 940 nm. An conventional outer cladding which surrounds the entire system is not shown for clarity.

A semiconductor diode array 12 provides high-power pumping radiation (for example, 1 to 3 watts) centered at a wavelength of 808 nm to a lens 14. The output signal from diode laser array 12 is projected through lens 14 into the end of cladding 17. The multimode pumping signal provided by diode array 12 is substantially confined and guided within the cladding layer 17, and, as the pumping light propagates along the cladding layer 17, the light crosses over and is absorbed by the core 16, thereby supplying pumping power thereto.

The optical cavity of laser 15 is formed by first and second reflecting members 18, 20 which are Bragg grating reflectors 18, 20. Reflector 18 is designed to be nearly 100% reflecting at the nominal lasing wavelength.

Reflective Bragg grating 20 serves as the output coupling element which couples laser 15 to another optical element. For example, laser 15 may be coupled to an optical fiber 22 having a cladding layer 24 and a core 26. Accordingly, grating 20 is arranged to be partially reflective and partially transmissive to light at the lasing wavelength. For example, grating 20 can have a reflectivity of 5% to 50% depending on the output power desired.

Grating 20 is arranged to be chirped in that the period of the spaced-apart reflective elements changes over the longitudinal extent of the reflector element. The grating as a "blue" end where the grating elements are spaced relatively close together and a "red" end where the elements are spaced farther apart.

In accordance with the principles of the invention, grating 20 is oriented such that the blue end of the chirped grating faces the reflective element 18 and the red wavelength of chirped grating 20 faces the output coupling end of the fiber laser cavity of fiber laser 15. By orienting the chirped fiber grating in this manner, the noise power produced by the cladding-pumped fiber laser 15 is substantially reduced over the noise power produced by the same laser with the grating orientation reversed.

The reduction in the output noise is illustrated in Table 1 below. Table 1 lists grating parameters and corresponding measured noise values expressed as a percentage of a value corresponding to a root mean square signal value for five different gratings. Grating 20 may be provided having a number of different parameters including but not limited to the bandwidth, chirp rate and reflectivity parameters listed below.

TABLE 1

| Grating # | BW (nm) | Relectivity (%) | Chirp Rate (nm/mm) | Length (mm) | B/R (%) | R/B (%) | B/R (%) | R/B (%) |
|---|---|---|---|---|---|---|---|---|
| 1 | 0.42 | 12.1 | 0.047 | 12 | 2.19 | 8.78 | 1.19 | 1.98 |
| 2 | 0.26 | 10.3 | 0.047 | 7 | 2.17 | 6.50 | 0.94 | 4.75 |
| 3 | 0.42 | 8.2 | 0.073 | 6 | 1.33 | 5.47 | 0.99 | 1.73 |
| 4 | 0.72 | 13.5 | 0.093 | 12 | 1.38 | 9.10 | 0.85 | 1.49 |
| 5 | 0.14 | 14.3 | 0.031 | 6 | 1.77 | 6.77 | 1.53 | 6.44 |

In the Table, Column 1 corresponds to the grating numbers of the five gratings. Thus, grating No. 1, for example, has the parameters listed in row 1 of the Table. Column 2 of the Table lists the optical bandwidth in (nm) of each of the gratings. Column 3 of the Table lists reflectivity of the gratings and Column 3 of the Table lists the chirp rate of each of the gratings. The chirp rate corresponds to the rate at which the grating changes with respect to length. Column 5 lists the overall length of the grating in nanometers.

Columns 6 and 7 list a measured noise power expressed as a percentage of an rms signal level at an output power typically of about 0.7 watts. It should be noted that Column 6 shows the noise power when the chirped grating is oriented such that the red end of the grating is towards the output coupling end of the fiber laser in accordance with the principles of the invention. Column 7 shows the noise power when the chirped grating 20 is oriented such that the blue end of the grating is towards the output coupling end of the fiber laser. An orientation of the Bragg grating in accordance with the principles of the invention clearly produces a marked decrease in the measured noise power.

Columns 8 and 9 also show similar results for noise values measured in a ytterbium ($Yb^{3+}$) doped fiber laser operating at an output power typically of about 6.2 watts and constructed generally in accordance with the construction illustrated in FIG. 1. The illustrated noise power is also expressed as a percentage of an rms signal level. Column 8 shows the noise power when the chirped Bragg grating is oriented such that the red end of the grating is towards the output end of the fiber laser and Column 9 shows the noise power when the chirped grating 20 is oriented such that the blue end of the grating is towards the output end of the fiber laser. The reduction in noise is similar to that experienced with the neodymium laser.

A review of Table 1 reveals that various characteristics of the chirped gratings affect the resulting noise power in the laser output. The bandwidth of the grating is a key factor, and, generally when the bandwidth of the grating increases, the noise decreases. For example, grating number 1 and grating number 4 in Table 1 have similar reflectivity parameters and are of identical length. However grating number 4 has a wider optical bandwidth and a higher chirp rate than grating number 1 and grating number 4 also produces lower noise values than grating number 1.

Similarly, the grating chirp rate also has an effect. As the chirp rate increases, the noise decreases. A chirp rate that is as high as practical is generally preferred. Consequently, a chirped grating with a relatively wide bandwidth and a relatively high chirp rate tends to produce a fiber laser having a relatively low noise characteristic.

In one embodiment, the chirped Bragg grating 20 is produced by transversely doping spaced-apart portions of the longitudinal fiber core 16 with atomic elements that modify the refractive index of the core. The "chirp" in the grating period is produced by modifying the period of the transversely doped fiber core portions during manufacture of the grating.

Figure 2:
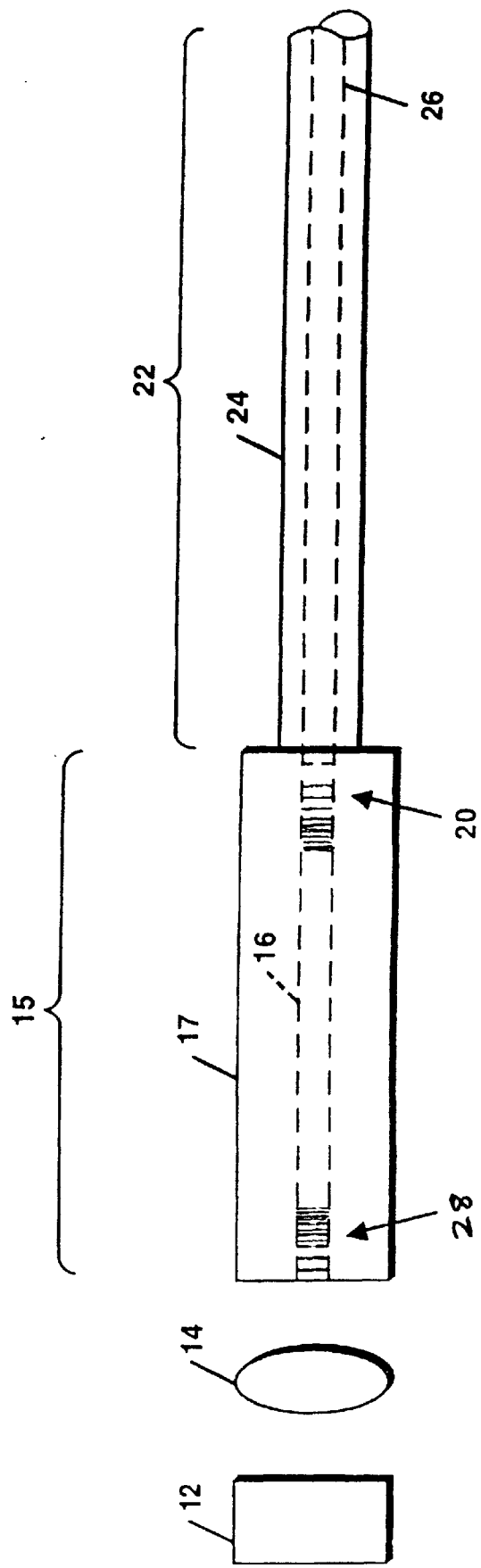
FIG. 2 is a schematic diagram of a cladding pumped fiber continuous wave laser similar to that of FIG. 1, but in which a chirped fiber Bragg grating is used at each end of the laser cavity.

Shown in FIG. 2 is an alternative embodiment of the invention which is similar to that of FIG. 1 except that the fully reflective grating reflector 18 is replaced with a chirped Bragg grating 28 having a partial reflectivity relative to light at the lasing wavelength. In one embodiment, the grating 28 has grating parameters which match those of grating 20. However, other variations include providing the grating 28 with bandwidth, chirp rate and reflectivity parameters which are independent of those of grating 20. The grating 28 is oriented such that the blue end of the grating faces the grating 20, and the red end faces the input coupling end of the fiber laser cavity. That is, the grating 28 is oriented such that the period of the spaced-apart reflective elements changes over the grating with the grating period increasing toward input coupling end of the fiber laser cavity.

In still another embodiment, the chirped grating 20 is manufactured as an unchirped fiber grating where the period of the transversely-doped fiber core portions is constant and a chirp is introduced by selectively bending the fiber core 16 along its length, thereby producing a varying grating period Having described preferred embodiments of the invention, it will now become apparent to one of ordinary skill in the art that other embodiments incorporating their concepts may be used. The inventive principles are not limited to these embodiments and other embodiments, but rather are limited only by the spirit and scope of the appended claims.

What is claimed is:

1. A low noise continuous wave fiber laser comprising:
    an optical fiber having a doped core and a cladding surrounding the core, the optical fiber having a first end and a second end;
    a first reflective element located substantially at the first fiber end;
    a chirped fiber Bragg grating located substantially at the second fiber end, the grating being oriented so that the grating period increases in a direction towards the second fiber end; and
    a pump source that pumps energy to the cladding such that continuous wave laser energy is emitted from the optical fiber.

2. The low noise fiber laser as recited in claim 1 wherein the first reflective element is a fiber Bragg grating.

3. The low noise fiber laser as recited in claim 1 wherein the chirped fiber Bragg grating is fabricated by transversely doping spaced-apart portions of the longitudinal fiber core with elements that modify the refractive index of the core wherein the period of the transversely-doped fiber core portions is varied during fabrication.

4. The low noise fiber laser as recited in claim 1 wherein the chirped fiber Bragg grating is fabricated by transversely doping periodic, spaced-apart portions of the longitudinal fiber core with elements that modify the refractive index of the core and selectively bending the fiber along its length, thereby producing a varying grating period.

5. The low noise fiber laser as recited in claim 1 wherein the core is fabricated from silica glass having an index of refraction of approximately 1.47 and doped with $Nd^{3+}$ ions.

6. The low noise fiber laser as recited in claim 1 wherein the core is fabricated from silica glass having an index of refraction of approximately 1.47 and doped with $Yb^{3+}$ ions.

7. The low noise fiber laser as recited in claim 1 wherein the chirped fiber Bragg grating has partial reflectivity and constitutes an output coupler for the fiber laser.

8. The low noise fiber laser as recited in claim 1 wherein the first reflective element has substantially total reflectivity.

9. The low noise fiber laser as recited in claim 1 wherein the grating is a first grating and wherein the laser further comprises a second grating having a period that increases in a direction towards the first fiber end.

10. A method for reducing noise in a continuous-wave fiber laser comprised of an optical fiber having a doped core and a cladding surrounding the core, the optical fiber having a first end and a second end, a first reflective element located substantially at the first fiber end, an output coupler located substantially at the second fiber end, and a pump source for supplying pumping energy to the cladding such that continuous wave laser energy is emitted from the fiber, the method comprising:
    A. locating a chirped fiber Bragg grating at one of the ends of the fiber so that the grating period increases in a direction away from a center of the fiber.

11. A method for constructing a low noise continuous-wave fiber laser, the method comprising the steps of:
    A. selecting an optical fiber having a multimode doped core and a cladding surrounding the core, the optical fiber having a first end and a second end;
    B. placing a first reflective element substantially at the first fiber end, the first reflective element having substantially total reflectivity;
    C. placing a chirped fiber Bragg grating substantially at the second fiber end, the grating being oriented so that the grating period increases in a direction towards the second fiber end; and
    D. supplying pumping energy to the cladding such that continuous wave laser energy is emitted from the fiber.

12. The method as recited in claim 11 wherein step B comprises the step of:
    B1. placing a fiber Bragg grating substantially at the first fiber end.

13. The method as recited in claim 11 wherein step C comprises the steps of:
    C1. fabricating the chirped fiber Bragg grating by transversely doping spaced-apart portions of the longitudinal fiber core with elements that modify the refractive index of the core while varying the period of the transversely-doped fiber core portions.

14. The method as recited in claim 11 wherein step C comprises the steps of:
    C2. fabricating the chirped fiber Bragg grating by transversely doping periodic, spaced-apart portions of the longitudinal fiber core with elements that modify the refractive index of the core; and
    C3. selectively bending the fiber along its length, thereby producing a varying grating period.

15. The method as recited in claim 11 wherein step A comprises the steps of:
    A1. fabricating the core from silica glass having an index of refraction of approximately 1.47; and
    A2. doping the core with $Nd^{3+}$ ions.

16. The method as recited in claim 11 wherein step A comprises the steps of:
    A3. fabricating the core from silica glass having an index of refraction of approximately 1.47; and
    A4. doping the core with $Yb^{3+}$ ions.

* * * * *